United States Patent
Hu et al.

(10) Patent No.: US 10,793,460 B2
(45) Date of Patent: Oct. 6, 2020

(54) GLASS FORMING FURNACE

(71) Applicant: CBASE TECHNOLOGY CO., LTD, Taoyuan (TW)

(72) Inventors: Kun-Yuan Hu, Taoyuan (TW); Yuan-Feng Lin, Taoyuan (TW)

(*) Notice: Subject to any disclaimer, the term of this patent is extended or adjusted under 35 U.S.C. 154(b) by 207 days.

(21) Appl. No.: 16/133,730

(22) Filed: Sep. 18, 2018

(65) Prior Publication Data

US 2019/0389758 A1   Dec. 26, 2019

(30) Foreign Application Priority Data

Jun. 20, 2018   (TW) .............................. 107208280 U

(51) Int. Cl.
C03B 23/00 (2006.01)
C03B 5/425 (2006.01)
C03B 11/06 (2006.01)

(52) U.S. Cl.
CPC .............. *C03B 5/425* (2013.01); *C03B 11/06* (2013.01); *C03B 2215/50* (2013.01)

(58) Field of Classification Search
CPC . C03B 11/08; C03B 23/0013; C03B 23/0093; C03B 2215/50; C03B 2215/69; C03B 2215/86; C03B 2215/87
See application file for complete search history.

(56) References Cited

U.S. PATENT DOCUMENTS

| | | | | |
|---|---|---|---|---|
| 5,983,671 | A * | 11/1999 | Haines | ...................... B28B 1/50 65/114 |
| 2006/0081005 | A1* | 4/2006 | Shibasaki | ............. C03B 11/122 65/29.12 |
| 2008/0003324 | A1* | 1/2008 | Utsugi | .................... C03B 11/08 425/542 |
| 2008/0102150 | A1* | 5/2008 | Tanaka | .................. C03B 11/005 425/210 |

FOREIGN PATENT DOCUMENTS

CN   106365420 A * 2/2017

OTHER PUBLICATIONS

Machine translation of CN 106365420 A (Year: 2017).*

* cited by examiner

*Primary Examiner* — Cynthia Szewczyk

(57) ABSTRACT

A glass forming furnace includes a forming zone, a cleaning zone, a plurality of sealing doors, and a conveying channel. The forming zone includes a pressure device. The pressure device includes a servo motor, a push rod, and a mold pressurizing mechanism. The push rod is connected with the servo motor. The push rod includes an end notch and an embedded structure. The mold pressurizing mechanism includes an inlet notch. The inlet notch is connected with the embedded structure. Wherein, the end notch is in contact with the inlet notch. The cleaning zone includes an active brush mechanism. The sealing doors are disposed at an inlet and an outlet of the forming zone, respectively. The sealing (Continued)

doors each include a valve. The valve has a cross-sectional thickness that is gradually decreased from top to bottom. The conveying channel passes through the forming zone and the cleaning zone. The conveying channel is configured to convey a plurality of glass forming molds. The beneficial effect of the present invention is that the heating zone can be sealed and the molds can be cleaned more effectively.

8 Claims, 9 Drawing Sheets

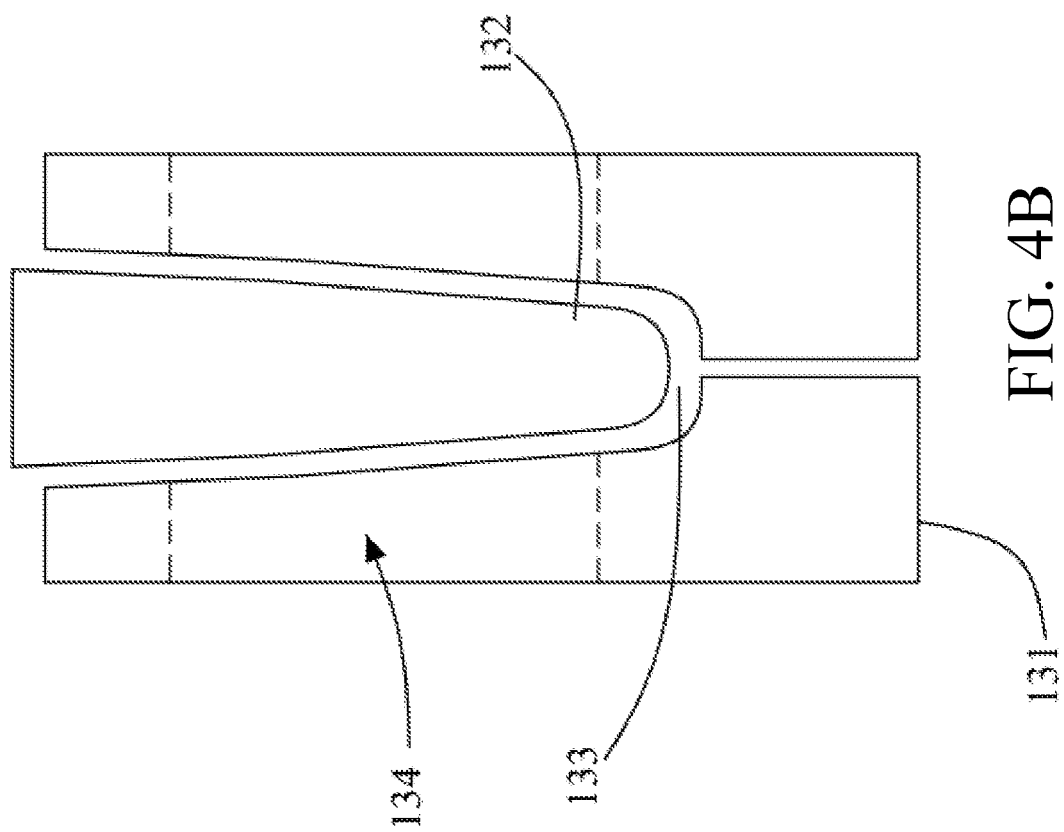

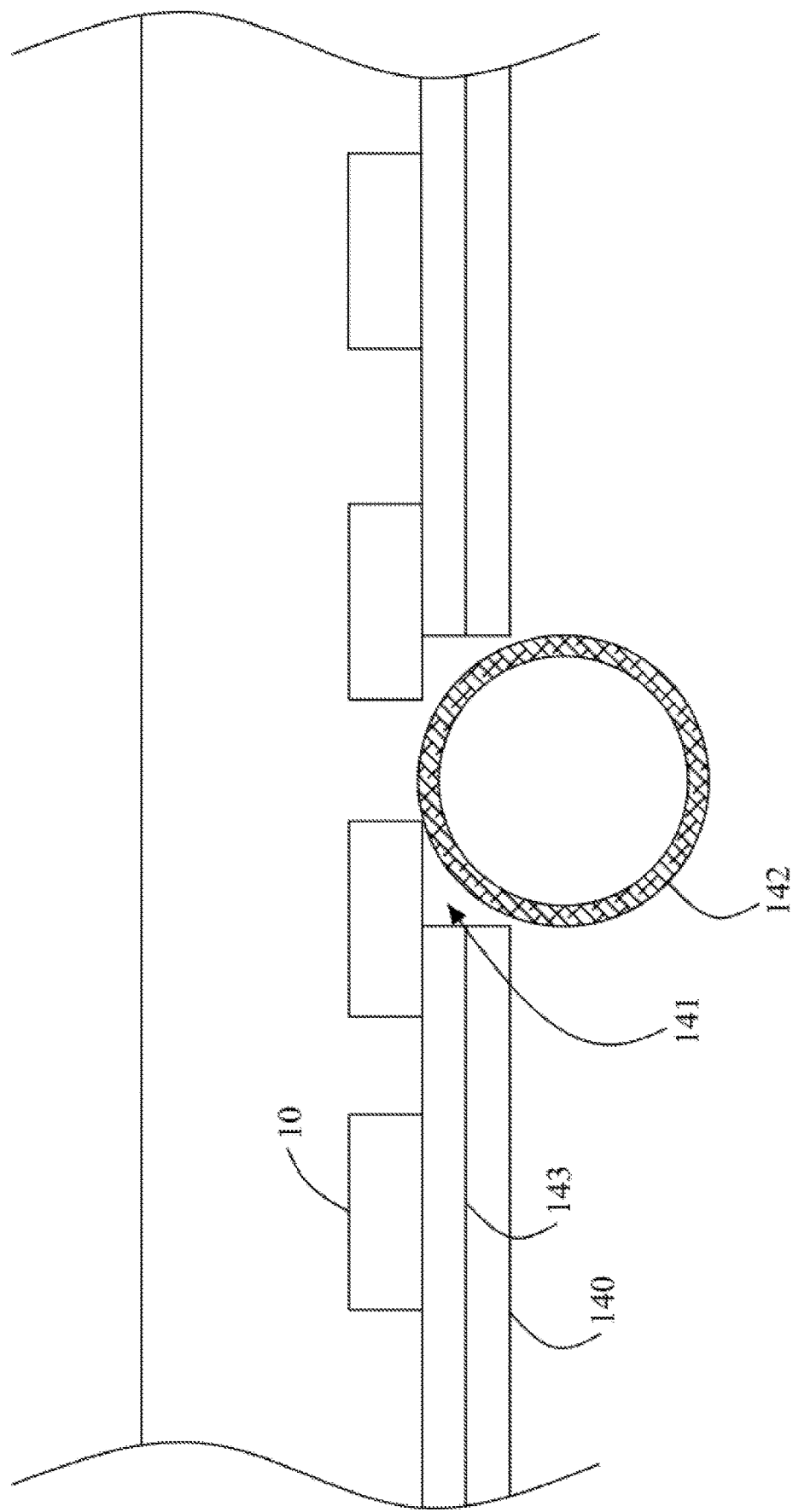

GLASS FORMING FURNACE

BACKGROUND OF THE INVENTION

Field of the Invention

The present invention relates to a forming furnace, and more particularly to a glass forming furnace.

Description of Related Art

With the advancement of technology, many electronic devices have gradually replaced the traditional mechanical operating devices with touch devices. Besides, the operating space and the size of the display are increased, providing a more intuitive and convenient operation, such as the touch screen of a smart phone, a car, and so on. Under such a background, the demand for touch devices in different fields is increased greatly, and the glass on the touch device also needs different shapes to match different devices.

In general, the shape of the glass is produced by placing a flat glass raw material on a mold and heating the mold to soften the glass raw material. After that, the glass raw material is attached to the mold by means of negative pressure or molding, and the glass raw material is shaped into a shape corresponding to the mold. After cooling, the glass component having a specific shape can be completed.

A conventional glass forming furnace has some drawbacks as follows:

1. The pressuring angle is immovable, so the angle at which the mold is placed must be accurately controlled, otherwise the pressure will be uneven and the forming effect will be poor.

2. The internal sealing effect of the forming furnace is not good. Oxygen enters the interior of the forming furnace, making the mold susceptible to oxidation and unpredictable side effects.

3. Mold cleaning needs to be done manually. In order to prevent the mold from carrying foreign matter into the forming furnace, the mold needs to be cleaned manually after the glass is formed.

Accordingly, the inventor of the present invention has devoted himself based on his many years of practical experiences to solve these problems.

SUMMARY OF THE INVENTION

In view of the above problems, the primary object of the present invention is to provide a glass forming furnace with a swing pressure device, a U-shaped sealing door and an automatic cleaning zone. The beneficial effect of the present invention is that the heating zone can be sealed and the mold can be cleaned more effectively.

A glass forming furnace provided by the present invention comprises a forming zone, a cleaning zone, a plurality of sealing doors, and a conveying channel. The forming zone includes a pressure device. The pressure device includes a servo motor, a push rod, and a mold pressurizing mechanism. The push rod is connected with the servo motor. The push rod includes an end notch and an embedded structure. The mold pressurizing mechanism includes an inlet notch. The inlet notch is connected with the embedded structure. Wherein, the end notch is in contact with the inlet notch. The cleaning zone includes an active brush mechanism. The sealing doors are disposed at an inlet and an outlet of the forming zone, respectively. The sealing doors each include a valve. The valve has a cross-sectional thickness that is gradually decreased from top to bottom. The conveying channel passes through the forming zone and the cleaning zone. The conveying channel is configured to convey a plurality of glass forming molds.

Preferably, the pressure device further includes a sleeve structure and a spring. The sleeve structure is fitted on the push rod. The spring is disposed on the sleeve structure and connected with the push rod.

Preferably, the mold pressurizing mechanism further includes a fixing notch and a fixing plug. The fixing notch is connected with the inlet notch. The fixing plug corresponds in shape to the fixing notch and is inserted into the fixing notch.

Preferably, the sealing doors each further include a sealing structure. The sealing structure has a recess. The recess corresponds in shape to the valve.

Preferably, the conveying channel further includes a low friction track for carrying the glass forming molds.

Preferably, in the cleaning zone, the conveying channel further includes a cleaning hole. The active brush mechanism is disposed in the cleaning hole.

Preferably, the conveying channel is a circulating channel.

Preferably, the end notch is a semi-circular notch.

Embodiments of the present invention will now be described, by way of example only, with reference to the accompanying drawings. It should be noted that the components in the drawings are merely schematic and are not drawn to the actual proportions of the components.

BRIEF DESCRIPTION OF THE DRAWINGS

FIG. 4B is a schematic view of the valve and the sealing structure of the present invention; and FIG. 5 is a schematic view of the cleaning zone of the present invention.

DETAILED DESCRIPTION OF THE INVENTION

The present invention provides a glass forming furnace with a movable mold pressurizing mechanism, an airtight valve and an automatic cleaning function, which improves the efficiency of glass forming greatly.

Figure 1:
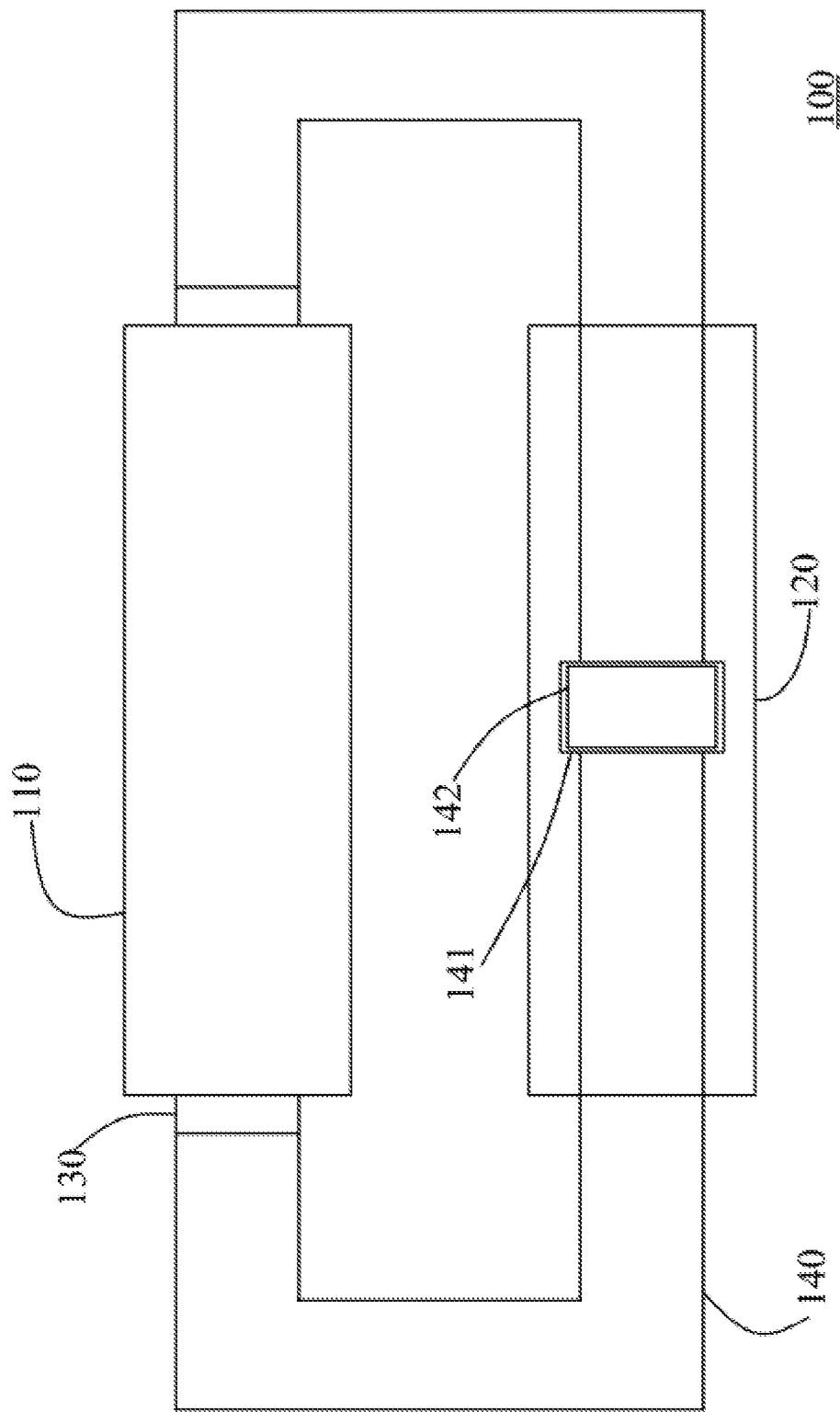
FIG. 1 is a top schematic view of the glass forming furnace of the present invention.

FIG. 1 is a top schematic view of a glass forming furnace in accordance with an embodiment of the present invention. The glass forming furnace comprises a forming zone 110, a cleaning zone 120, a plurality of sealing doors 130, and a conveying channel 140. Wherein, the conveying channel 140 passes through the forming zone 110 and the cleaning zone 120. The conveying channel 140 is configured to convey a plurality of glass forming molds 10. In addition, in an implementation, the glass forming furnace further comprises a heating zone and a cooling zone (not shown). The conveying channel 140 sequentially passes through the heating zone, the forming zone 110, the cooling zone, and the cleaning zone 120. The conveying channel is a circulating channel that allows the glass forming molds 10 to pass through the heating zone, the forming zone 110, the cooling zone, and the cleaning zone 120 continuously.

In an embodiment, the conveying channel 140 further includes a low friction track 143. The glass forming molds 10 are moved on the low friction track 143. The low friction track 143 allows the glass forming molds 10 to move more smoothly. The low frictional force can reduce the dust generated by the glass forming molds 10 due to friction.

Figure 2A:
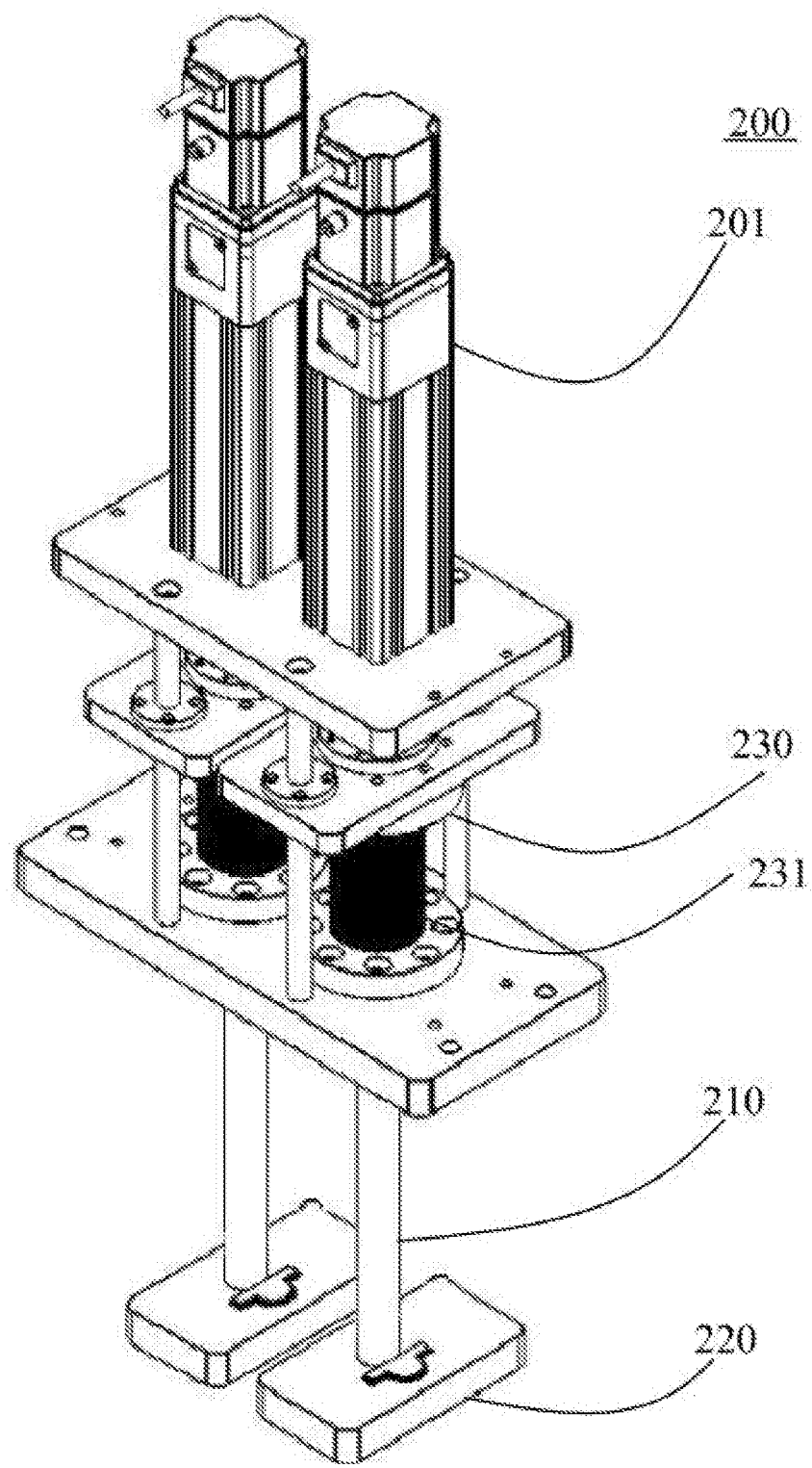
FIG. 2A is a schematic view of the pressure device of the present invention.

The heating zone is to heat the glass forming molds. After that, the glass forming molds enter the forming zone for high pressure forming. The forming zone is provided with at least one pressure device 200. Please refer to FIG. 2A. FIG. 2A is a schematic view of the pressure device. The pressure device 200 includes a servo motor 201, a push rod 210, and a mold pressurizing mechanism 220. The servo motor 201 is connected with the push rod 210. Preferably, they are connected via a screw rod so that rotation of the servo motor 201 can drive the push rod 210 to move up and down. An end of the push rod 210 is provided with an end notch 212 and an embedded structure 211.

In an embodiment, the pressure device 200 further includes a sleeve structure 230 and a spring 231. The sleeve structure 230 is fitted on the push rod 210, that is, the push rod 210 passes through the sleeve structure 230. The spring 231 is disposed on the sleeve structure 230 and connected with the push rod 210. The arrangement of the spring 231 allows the servo motor 201 to control the push rod 210 more smoothly.

Figure 2B:
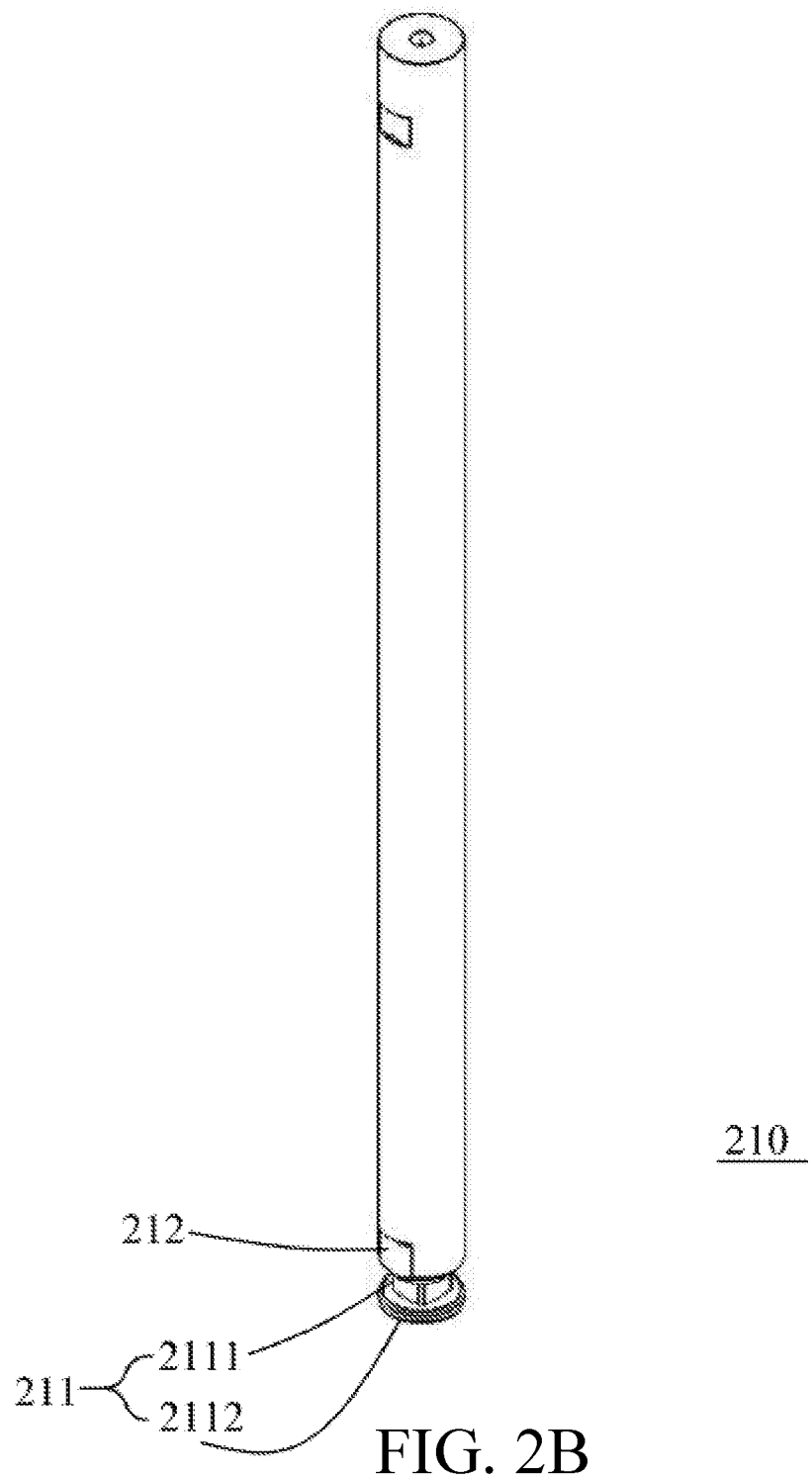
FIG. 2B is a schematic view of the push rod of the present invention.

Please refer to FIG. 2B. FIG. 2B is a schematic view of the push rod. The end notch 212 is disposed at one end of the push rod 210 and is disposed at one end connected to the mold pressurizing structure 220. In this embodiment, the push rod 210 is cylindrical, and the end notch 212 is a semi-circular notch and occupies a certain area of the cross-section of the push rod 210.

The embedded structure 211 is composed of a neck portion 2111 and a head portion 2112. The diameter of the neck portion 2111 is less than that of the head portion 2112. Therefore, the embedded structure 211 forms a mushroom-like structure at the end of the push rod 210 connected to the mold pressurizing mechanism 220, configured to be embedded in an inlet notch 221 of the mold pressurizing mechanism 220.

Figure 2D:
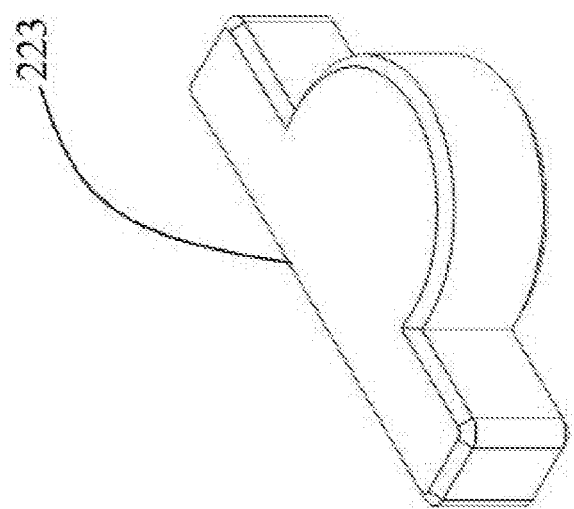
FIG. 2C and FIG. 2D are schematic views of the mold pressurizing mechanism and the fixing plug of the present invention.
Figure 2C:
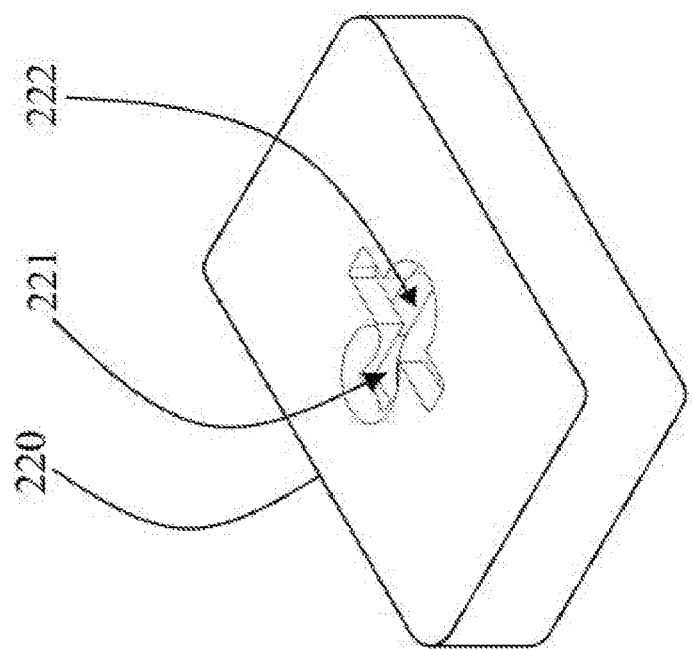

Please refer to FIG. 2C and FIG. 2D. FIG. 2C and FIG. 2D are schematic views showing the mold pressurizing mechanism and the fixing plug. The mold pressurizing mechanism 220 is in the form of a disk and has a certain thickness. The mold pressurizing mechanism 220 is configured to be in contact with the glass forming molds 10. The mold pressurizing mechanism 220 has an inlet notch 221 and a fixing notch 222 at the center thereof. The inlet notch 221 is connected to the embedded structure 211 of the push rod 210.

Figure 3B:
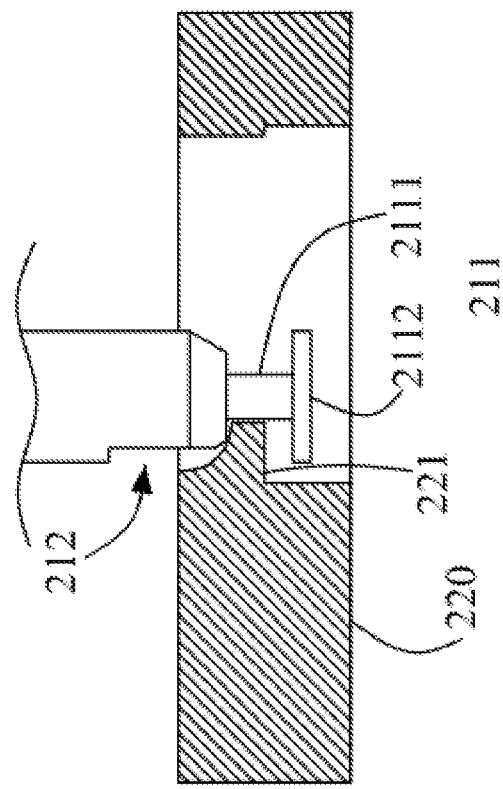
FIG. 3A to FIG. 3D are schematic views showing the connection of the push rod and the mold pressurizing mechanism of the present invention.
Figure 3A:
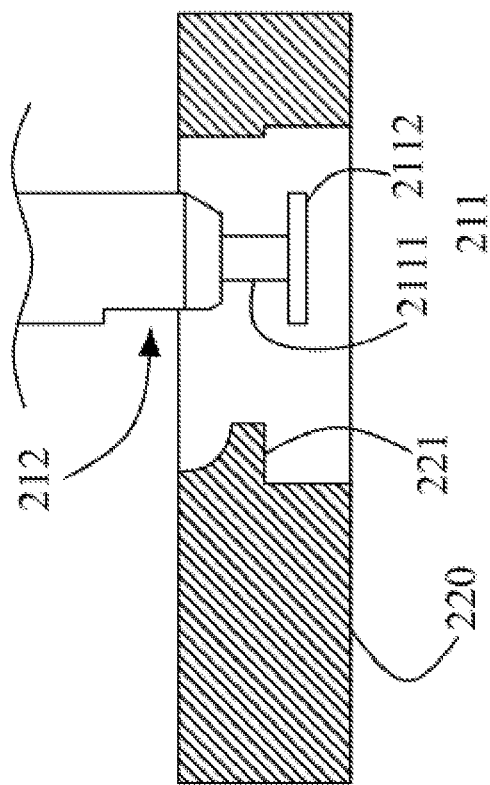
Figure 3D:
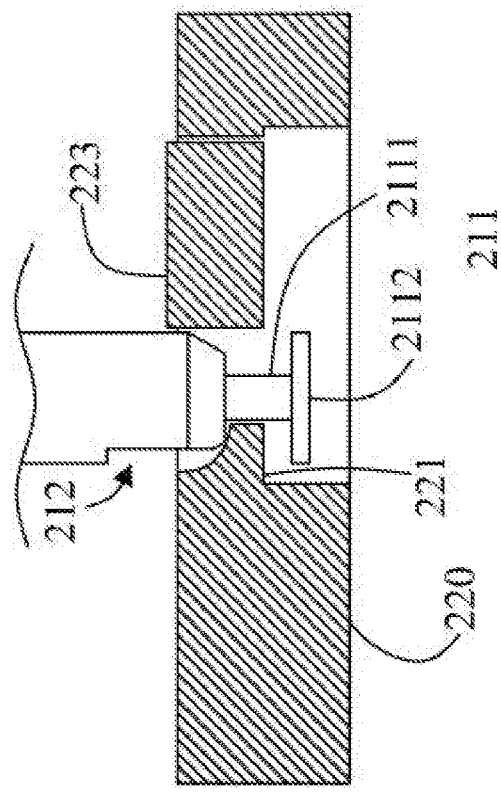
Figure 3C:
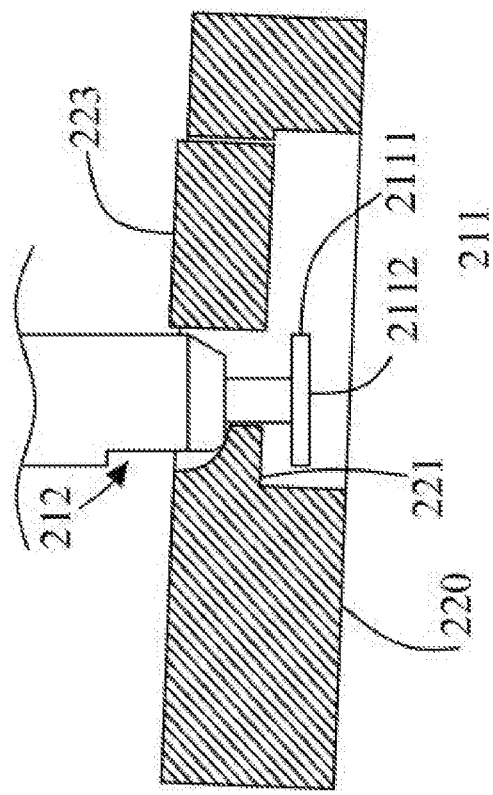

Please refer to FIG. 3A to FIG. 3D. FIG. 3A to FIG. 3D are schematic views showing the connection of the push rod and the mold pressurizing mechanism. The embedded structure 221 of the push rod 210 is inserted from the fixing notch 222, and then the neck portion 2111 of the embedded structure 211 is inserted into the inlet notch 221 (FIG. 3A). Since the diameter of the head portion 2112 of the embedded structure 211 is larger, the push rod 210 is engaged in the inlet notch 221 and cannot be pulled upward (FIG. 3B). Next, a fixing plug 223 is placed in the fixing notch 222 (FIG. 3C). The fixing plug 223 has a shape corresponding to the fixing notch 222, so that the fixing plug 223 can be tightly fitted into the fixing notch 222 while the push rod 210 is fixed. At this time, due to the curved configuration of the end notch 212 of the push rod 210 and the inlet notch 221, the mold pressurizing mechanism 220 can be swung (FIG. 3D), so that the mold pressurizing mechanism 220 is fit for the glass forming molds 10 placed at different angles.

Please refer to FIG. 5. FIG. 5 is a schematic view of a cleaning zone. The cleaning zone 120 is configured to clean the glass forming molds 10. The cleaning zone 120 includes an active brush mechanism 142 configured to wipe away dust or foreign matter on the glass forming molds 10. In an embodiment, the conveying channel 140 in the cleaning zone 120 further includes a cleaning hole 141. The active brush mechanism 142 is disposed in the cleaning hole 141. That is, when the glass forming molds 20 pass through the cleaning zone 120 from the conveying channel 140, they can be swept by the active brush mechanism 142, and the active brush mechanism 142 cleans the glass forming molds 20.

As shown in FIG. 1A and FIG. 1B, the glass forming furnace further includes a plurality of sealing doors 130. The sealing doors 130 are disposed at an inlet and an outlet of the forming zone 110. The sealing doors 130 are configured to maintain the pressure inside the forming zone 110 and to prevent foreign matter or oxygen from entering the forming zone 110. In an embodiment, the forming zone 110 is filled with nitrogen to prevent the glass forming molds 10 from being oxidized in contact with oxygen at a high temperature. Besides, a relatively high pressure is formed in the forming zone 110. When the sealing doors 130 are opened to allow the glass forming molds to pass, external oxygen does not enter the forming zone 110.

Figure 4A:
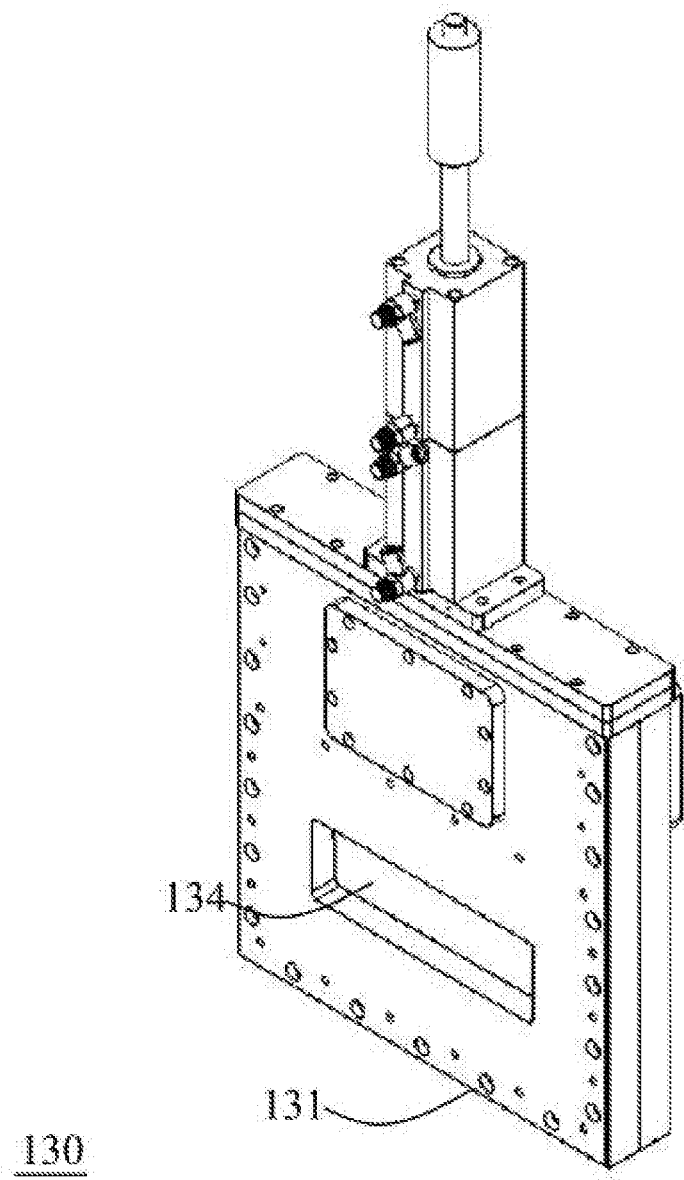
FIG. 4A is a schematic view of the sealing door of the present invention.

Please refer to FIG. 4A. FIG. 4A is a schematic view of the sealing door. The sealing door 130 includes a valve 132 and a sealing structure 131. The cross-sectional thickness of the valve 132 is gradually decreased from top to bottom, that is, viewed from the side, the valve 132 has a U-like shape. The sealing structure 131 is composed of two symmetrical members, such that a U-shaped recess 133 is formed in the sealing structure 131. The recess 133 corresponds in shape to the valve 132 so that the valve 132 can be inserted into the recess 133. The sealing structure 131 further includes a through hole 134 for allowing the glass forming molds 10 to pass when the sealing door 130 is opened. When the sealing door 130 is closed, the through hole 134 is closed, so that the valve 132 and the sealing structure 133 close the through hole 134 to bring a sealing effect. In particular, the U-shaped valve 132 and the recess 133 are more capable of improving sealing performance.

Please refer to FIG. 4B. FIG. 4B is a schematic view of the valve and the sealing structure. The symmetrical structure of the sealing structure 131 constitutes the recess 133. The recess 133 corresponds in shape to the valve 132, so that the valve 132 can be inserted into the recess 133 to close the through hole 134.

The glass forming furnace 100 of the present invention improves the defects of the conventional glass forming furnace through various improvements. The mold pressurizing mechanism 220 is designed to be swung on the pressure device 200. Therefore, when the mold pressurizing mechanism 220 pressurizes the glass forming molds 10, it is fit for the glass forming molds 10 placed at different angles, and the glass forming molds 10 are subjected to more uniform pressure. For the U-shaped design of the sealing door 130, the cross-sectional thickness of the valve 132 of the sealing door 130 is gradually decreased from top to bottom to be in a U shape, so that when the sealing door 130 is closed, it can provide a better sealing effect and maintain the pressure inside the forming zone 110 and isolate external foreign objects. The cleaning zone 120 is provided with the active brush mechanism 142. After the glass is formed, the glass forming molds 10 are automatically cleaned by the active brush mechanism 142 when passing through the cleaning zone 120, thereby reducing manual operations and improving the efficiency of the glass forming molds 10. Through the above-described improved design, the forming efficiency and yield of the glass forming furnace 100 can be improved greatly. The service life of the molds can be improved, and the labor cost can be reduced.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A glass forming furnace, comprising:
   a forming zone, including a pressure device, the pressure device including:
      a servo motor;
      a push rod, connected with the servo motor, the push rod including an end notch and an embedded structure; and
      a mold pressurizing mechanism, including an inlet notch, the inlet notch being connected with the embedded structure;
      wherein the end notch is in contact with the inlet notch;
   a cleaning zone, including an active brush mechanism;
   a plurality of sealing doors, disposed at an inlet and an outlet of the forming zone respectively, the sealing doors each including a valve, the valve having a cross-sectional thickness that is gradually decreased from top to bottom; and
   a conveying channel, passing through the forming zone and the cleaning zone, the conveying channel being configured to convey a plurality of glass forming molds.

2. The glass forming furnace as claimed in claim 1, wherein the pressure device further includes:
   a sleeve structure, fitted on the push rod; and
   a spring, disposed on the sleeve structure and connected with the push rod.

3. The glass forming furnace as claimed in claim 1, wherein the mold pressurizing mechanism further includes:
   a fixing notch, connected with the inlet notch; and
   a fixing plug, corresponding in shape to the fixing notch and being inserted into the fixing notch.

4. The glass forming furnace as claimed in claim 1, wherein the sealing doors each further include a sealing structure, the sealing structure has a recess, and the recess corresponds in shape to the valve.

5. The glass forming furnace as claimed in claim 1, wherein the conveying channel further includes a low friction track for carrying the glass forming molds.

6. The glass forming furnace as claimed in claim 1, wherein in the cleaning zone, the conveying channel further includes a cleaning hole, and the active brush mechanism is disposed in the cleaning hole.

7. The glass forming furnace as claimed in claim 1, wherein the conveying channel is a circulating channel.

8. The glass forming furnace as claimed in claim 1, wherein the end notch is a semi-circular notch.

\* \* \* \* \*